July 12, 1955     J. C. KIRCHER, JR     2,712,720
AUTOMATICALLY OPERATED THROW PLATE TYPE GRASS CATCHER
Filed May 4, 1954
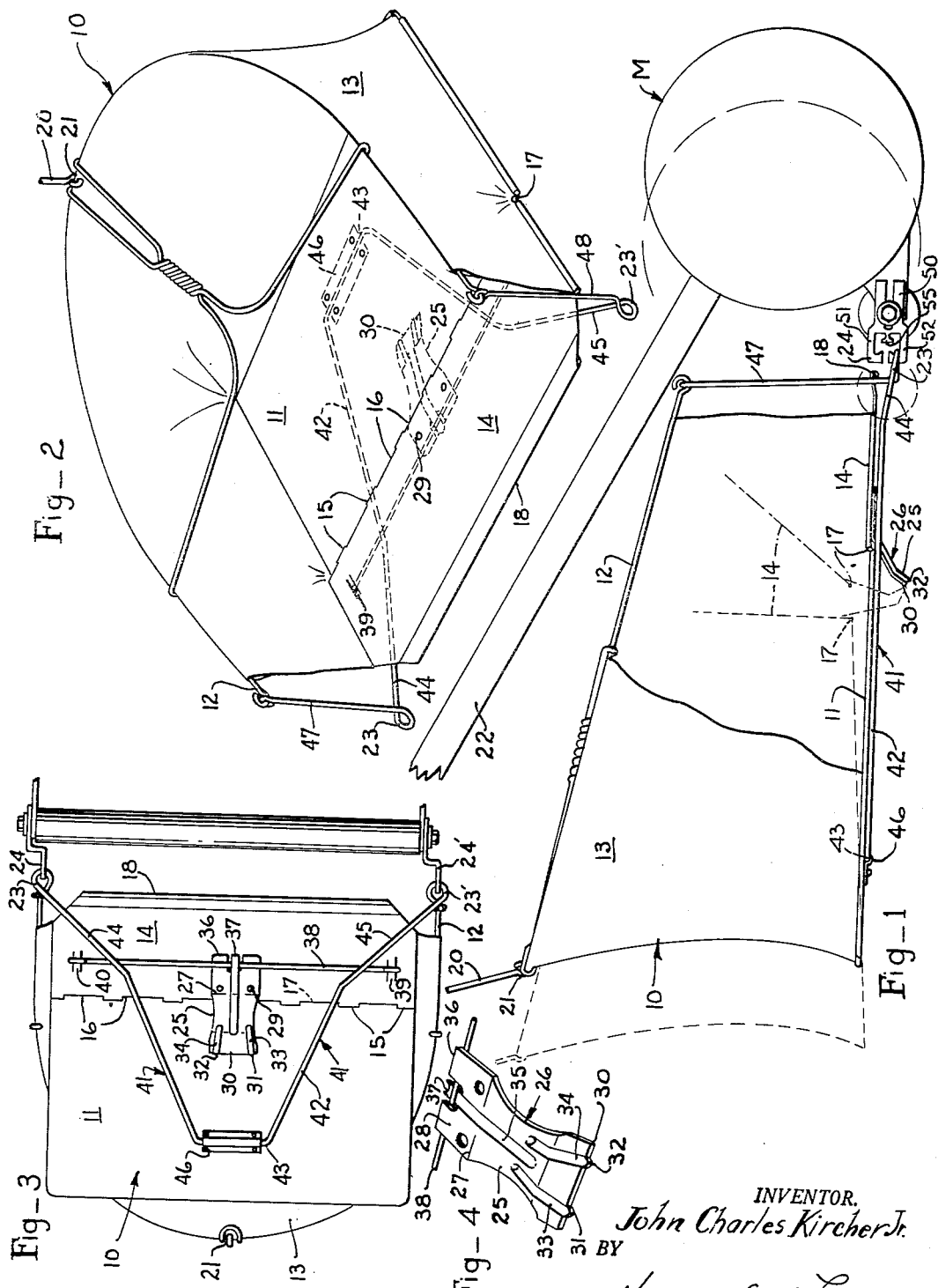
INVENTOR.
*John Charles Kircher Jr.*
BY
*Hansen and Lane*
HIS ATTORNEYS United States Patent Office 2,712,720
Patented July 12, 1955

2,712,720

AUTOMATICALLY OPERATED THROW PLATE TYPE GRASS CATCHER

John C. Kircher, Jr., San Jose, Calif.

Application May 4, 1954, Serial No. 427,594

8 Claims. (Cl. 56—199)

This invention relates to grass catchers and more particularly to grass catchers of the type having a throw plate for moving grass clippings back into the rearward portion of such catcher.

The use of a throw plate on a grass catcher is shown and described in my U. S. Letters Patent No. 2,300,934, dated November 3, 1942, and my U. S. Letters Patent No. 2,668,411, dated February 9, 1954. In both of these prior patents the throw plate is manipulated by a foot lever arrangement at the option of the user. The present invention contemplates a completely automatic operation of the throw plate upon backward movement of the lawn mower with the grass catcher attached. This has been accomplished in a manner as shown in the De Vol Patent No. 2,440,934, dated May 4, 1948.

In this connection, it will be noted that downwardly-rearwardly extending earth engaging lugs are employed. These lugs are formed as a part of the throw plate and are so disposed as to dig into the grass upon backward movement of the mower and catcher to automatically swing the throw plate backward and cast grass clippings into the rearmost area of the catcher. However, it was discovered that the foregoing action tended to raise the bottom of the catcher, particularly adjacent its point of connection with the mower. This undue lift imparted to the catcher caused the hook eyes on the fore end of the catcher to disengage the rearwardly extending hooks on the mower. It is an object of this invention to provide a supporting arrangement for the bottom of the catcher for counteracting the lifting effect of the skid type throw plate operator.

Another object of this invention is to provide, in a grass catcher of the type embodying an automatically operated throw plate, a novel bottom support hingedly connected to the bottom of the catcher in a position to stabilize the grass catcher frame although the catcher bottom is articulated during automatic operation of the throw plate.

Another object is to provide in an automatically operated throw plate type of grass catcher a novel bottom support permitting articulation of the catcher bottom without disturbing connection of said catcher bottom to a mower.

These and other objects and advantages of the present invention will become more apparent from a reading of the following description in the light of the drawings in which:

Fig. 1 is a side view of a grass catcher attached to a mower and broken away in part to illustrate the present invention.

Fig. 2 is a perspective view of the grass catcher of Fig. 1.

Fig. 3 is a bottom plan view of the grass catcher of Figs. 1 and 2 and part of the mower of Fig. 1 and at slightly reduced scale with respect thereto.

Fig. 4 is a fragmentary perspective view of a part illustrated in Figs. 1 to 3 inclusive.

In general the grass catcher 10 has a flat sheet metal bottom 11 joined to an upper bowed frame 12 by a heavy duck canvas skirting 13. The bottom 11 is provided with a throw plate 14 having hinge bosses 15 on its rearmost edge interfitting between like bosses 16 on the fore edge of the bottom 11 and hingedly connected therewith by a wire bale or pin 17 extending completely across the catcher bottom. The fore edge or lip 18 of the throw plate 14 is adapted to be disposed immediately behind the lawn mower M to receive grass clippings thrown rearwardly from the sickle blades of the mower.

The grass catcher 10 is connected to the mower M in the usual manner by a strap or hook 20 linked to the bight of the mowed frame 12 as at 21 and releasably hung on the mower shaft 22 in the usual fashion. In addition to the foregoing, both of the fore corners of the catcher 10 are adapted for connection with hooks 24—24' respectively at the rearmost corners of the mower M.

The throw plate 14 is adapted to be swung rearwardly about the hinge pin 17 to cast grass clippings into the rearmost area of the catcher. For this purpose a skid 25 is secured to the underside of the throw plate 14 in a manner as now to be explained. The skid 25, Fig. 4, comprises a metal stamping 26 bent downwardly as at 27 at an angle of approximately 30°–35° to provide a mounting panel 28 adapted to lie flatly against the underside of the throw plate 14. This mounting panel 28 is secured to the throw plate 14 by rivets or by spot welding as at 29. The skid 25 is disposed midway between the sides of the throw plate and with thie break line 27 of the skid substantially aligned with the rearmost edge of the throw plate, i. e., adjacent the hinge bosses 15. In this manner the balance of the skid 25 extends downwardly and rearwardly from the rearmost edge of the throw plate as best seen in Fig. 1.

As a consequence of the foregoing arrangement, the skid 25 will normally glide over the clipped grass during forward movement of the mower and catcher. However, when the mower is pulled backwardly the same backward motion is imparted to the catcher which causes the lowermost or free end 30 of the skid 25 to engage the turf whereupon the throw plate 14 is rocked rearwardly (anti-clockwise Fig. 1) to throw grass clippings received by the throw plate backwardly into the rearmost area of the catcher.

In connection with the foregoing it will be noted that the free end 30 of the skid is provided with spike teeth 31 and 32 which embed themselves into the turf upon rearward movement of the catcher so as to avoid slippage and assure the back throw. These spike teeth 31 and 32 are formed at the ends of depressed grooves 33 and 34 respectively impressed into the skid body during stamping thereof. Note also that a similar depressed groove 35 is impressed into the main body of the skid, including its mounting panel 28. These grooves 33, 34 and 35 serve as stiffeners of the skid to prevent bending thereof during usage.

The foremost edge 36 of the mounting panel 28 is cut away at each side of the groove 35 therein to provide a tab 37 which is bent downwardly out of the normal plane in which the panel 28 lies to receive a cross bar 38. This cross bar 38 extends parallel to the hinged edge of the throw plate 14 and has its ends anchored in downwardly bent stirrups 39 and 40 formed in the throw plate. Thus the cross bar 38 serves as a tie bar across the full width of the throw plate to uniformly transmit the thrust against the same from the skid 25 each time the latter engages into earth to rock the throw plate backwardly. This uniform transmission of thrust from the skid to the throw plate by way of the tie bar 38 tends to minimize flexing of the throw plate 14 particularly in its region of connection to the skid mounting panel 28. Such continued flexing would over long usage cause the throw plate to crystallize and break adjacent the mounting panel 28. The tie bar 38, therefore, serves the dual purpose of transmitting the thrust to as well as of minimizing breakage of the throw plate during constant usage.

As previously explained the grass clipping catcher is adapted to have its lower fore corners connected to the hooks 24—24' on the mower M. This is generally accomplished by the formation of eyes 23—23' at the fore corners of the catcher bottom. As a general rule these eyes 23—23' are formed as a rigid part of the catcher bottom with the result that the bottom 11 would be tilted backwardly each time the skid 25 engaged earth. It will therefore be apparent that when the eyes 23—23' are formed as a rigid part of the bottom they would be lifted out of connecting engagement with the hooks 24. To overcome this undesired disconnection of the eyes 23—23' relative to the hooks 24—24' the present invention contemplates the provision of a yoke support 41 for the bottom 11 to afford a lost motion action therein upon each rearward thrust of the catcher and operation of the throw plate 14 by the skid 25.

The yoke support 41 is preferably formed as a part of the framework for the catcher body so as to render the catcher bottom 11 tiltable without imparting any of this tilting action of the bottom 11 to the eyes 23—23'. This is accomplished by providing the yoke support of ⅛" wire 42 bent into a U shape. This U-shaped wire 42 includes a bight 43 disposed appreciably rearwardly of the skid 25, i. e., adjacent the rearmost edge of the catcher bottom. The U-shaped wire 42 further includes a pair of legs 44—45 extending diagonally outwardly from the bight 43 toward the fore corners of the catcher bottom. More particularly it should be noted that the bight 43 is slightly longer than the width of the skid 25 and is hingedly connected to the catcher bottom by a strap 46 riveted or spot welded to the bottom panel 11. Moreover, the other ends of the legs 44—45 extend divergingly from the ends of the bight 43 so as to underlie the main portion of the catcher bottom 11 substantially equidistant between the skid 25 and the side margins of the catcher bottom along the hinge line 17 at the fore edge of the bottom 11. Thereafter the wire 42 comprising the legs 44—45 of the yoke 41 are bent outwardly at a greater angle toward the fore corners of the catcher, i. e., where the fore lip 18 of the throw plate 14 would, if extended, converge with the side margins of the catcher bottom.

The ends of the legs 44—45 of the yoke 41 may terminate in eyes 23—23' but I prefer to form the eyes 23—23' in the wire element 42 and extending these extensions of the legs 44—45 upwardly in the form of struts 47—48 for the forward corners of the catcher framework. It will thus be seen that the free ends of the wire element 42 are ultimately connected to the fore ends of the upper bowed frame 12 from which the canvas skirting 13 is suspended.

From the foregoing it will be seen that the wire element 42 forms the yoke support 41 upon which the catcher bottom 11 as well as the throw plate 14 is normally supported. Moreover, since the bight 43 of the yoke 41 is hingedly connected to the bottom panel 11 the latter, as well as the throw plate 14, will be drawn rearwardly as well as fowardly with the mower M. Because the yoke 41 is hingedly connected to the bottom panel 11 substantially rearwardly on the bottom panel any rocking motion imparted to this panel by backward action of the skid 25 is not imparted to the yoke 41. Consequently, the eyes 23—23' formed at the lower fore corners of the catcher frame are not elevated and will therefore remain in hooked relation with the hooks 24—24' on the mower M.

As a further precaution against accidental lifting of the eyes 23—23' out of engagement with the hooks 24—24', anti-disconnect hooks may be used. Briefly, these anti-disconnect hooks each comprise E-shaped retainers 50 constituting the hooks 24—24' on the lawn mower M.

The jaws 51—52 of the E-shaped retainer 50 extend toward each other and have their terminal faces spaced from each sufficiently to admit the ⅛" wire element 42 from which the eyes 23 or 23' are formed. That portion of the wire element constituting the eye 23 or 23' therefore rests upon the lower arm of the E-shaped retainer and surrounds the upstanding jaw 51 or 52 formed on the respective lower arm. The jaws 51 and 52 are filleted adjacent their terminal faces to divert the wire element within the retainer 50 inwardly in the event of accidental raising of the eye 23—23' relative to the same. The vertical back of the E-shaped retainer has a middle leg 55 which is likewise filleted between the vertical back as well as the lower arm so that even though the wire element portion of the eye resting on such lower arm shifts forwardly toward the vertical back of the E-shaped retainer, the eye 23 or 23' cannot be accidentally raised.

From the foregoing it will be apparent that I have provided a grass catcher with a throw plate which is automatically rocked backwardly by action of a depending skid upon rearward movement of the catcher. In combination with the foregoing, I have provided a stabilized support for a catcher bottom which will counteract the tendency of the catcher from becoming accidentally detached from the mower.

While I have specifically described my improvements in grass catchers of the automatically operated throw plate type, it should be apparent that the same is susceptible to variation, alteration and/or modification without departing from the spirit of this invention. I therefore desire to avail myself of all variations, alterations and/or modifications as fairly come within the purview of the appended claims.

What I claim as new and desire to protect by Letters Patent is:

1. In a grass catcher for lawn mowers of the type including a receptacle having a bottom provided with a hinged throw plate at its fore edge arranged to receive grass clippings from the mower and for casting such grass clippings into the rearmost area of said receptacle, a skid plate comprising a metal stamping provided with a mounting panel and a skid portion bent at an angle relative thereto, said mounting panel being secured to the under side of said hinged throw plate midway its sides and adjacent its edge of hinged relation with the bottom of said receptacle, said skid portion of said metal stamping extending downwardly and rearwardly from said hinged throw plate so as to glide over the lawn during forward movement of said mower and receptacle over the same and for engaging turf upon rearward movement of said mower and receptacle for rocking said hinged throw plate rearwardly to cast grass clippings from the same to the rearmost area of said receptacle, and a cross bar extending parallel to the hinged fore edge of said bottom having its mid portion secured to said mounting panel and its extreme ends anchored to said throw plate adjacent the side margins for transmitting the thrust uniformly from said skid portion to said throw plate and to counteract continued flexing of the latter during prolonged operation of said throw plate by said skid plate.

2. In a grass catcher for lawn mowers of the type including a receptacle having a bottom provided with a hinged throw plate at its fore edge arranged to receive grass clippings from the mower and for casting such grass clippings into the rearmost area of said receptacle, a skid plate comprising a metal stamping bent at an angle to provide a mounting panel and a skid portion, said mounting panel being secured to the under side of said hinged throw plate midway its sides and adjacent its edge of hinged relation with the bottom of said receptacle, said skid portion extending downwardly and rearwardly from said hinged throw plate so as to glide over the lawn during forward movement of said mower and receptacle over the same and for engaging turf upon rearward movement of said mower and receptacle for rocking said hinged throw plate rearwardly, and means for counteracting the lifting effect of said skid plate upon the bottom of said receptacle comprising a yoke having a narrow bight pivotally secured to the under side of the bottom of said receptacle substantially rearwardly of said throw plate, said yoke having diverging arms each extending toward a respective fore corner of the catcher for supporting the bottom of said catcher and said throw plate, the ends of each of said diverging arms having an eye formed therein for connecting the same to said mower.

3. In a grass catcher for lawn mowers of the type including a receptacle having a bottom provided with a hinged throw plate at its fore edge arranged to receive grass clippings from the mower and for casting such grass clippings into the rearmost area of said receptacle, a skid plate comprising a metal stamping bent at an angle to provide a mounting panel and a skid portion, said mounting panel being secured to the under side of said hinged throw plate midway its sides and adjacent its edge of hinged relation with the bottom of said receptacle, said skid portion extending downwardly and rearwardly from said hinged throw plate so as to glide over the lawn during forward movement of said mower and receptacle over the same and for engaging turf upon rearward movement of said mower and receptacle for rocking said hinged throw plate rearwardly, and means for counteracting the lifting effect of said skid plate upon the bottom of said receptacle comprising a yoke, a boss strap secured to the under side of said catcher bottom adjacent its rearward marginal edge and embracing the bight portion of said yoke for pivotally connecting the same to said catcher bottom, said yoke having diverging arms each extending toward a respective fore corner of the catcher for supporting said catcher bottom and hinged throw plate in a common plane, and an eye on the end of each of said diverging arms for connecting the same to said mower.

4. In a grass catcher adapted to be connected to hooks on a lawn mower and of the type including a receptacle having a bottom provided with a hinged throw plate at its fore edge arranged to receive grass clippings from the mower and for casting such grass clippings into the rearmost area of said receptacle, a skid plate comprising a metal stamping bent at an angle to provide a mounting panel and a skid portion, said mounting panel being secured to the under side of said hinged throw plate midway its sides and adjacent its edge of hinged relation with the bottom of said receptacle, said skid portion extending downwardly and rearwardly from said hinged throw plate so as to glide over the lawn during forward movement of said mower and receptacle over the same and for engaging turf upon rearward movement of said mower and receptacle for rocking said hinged throw plate rearwardly, and means for counteracting the lifting effect of said skid plate upon the bottom of said receptacle comprising a U-shaped wire bale yoke having its bight pivotally secured to the under side of said catcher bottom substantially rearwardly of said throw plate, said yoke having diverging arms each extending toward a respective fore corner of the catcher, each said arm diagonally traversing the fore end of said catcher bottom substantially midway between said skid and the side margin of said catcher bottom so as to underlie the throw plate hingedly connected to the fore end of said bottom, the ends of each of said diverging arms having an eye for connecting the same to the hooks on said mower.

5. In a grass catcher for lawn mowers of the type including a receptacle having a bottom provided with a hinge throw plate at its fore edge arranged to receive grass clippings from the mower and for casting such grass clippings into the rearmost area of said receptacle, a skid plate comprising a metal stamping bent at an angle to provide a mounting panel and a skid portion, said mounting panel being secured to the under side of said hinged throw plate midway its sides and adjacent its edge of hinged relation with the bottom of said receptacle, said skid portion extending downwardly and rearwardly from said hinged throw plate so as to glide over the lawn during forward movement of said mower and receptacle over the same and for engaging turf upon rearward movement of said mower and receptacle for rocking said hinged throw plate rearwardly, and means for counteracting the lifting effect of said skid plate upon the bottom of said receptacle comprising a U-shaped wire bale yoke, a strap secured to the bottom of said catcher for pivotally connecting the bight portion of said yoke to the under side of said catcher bottom substantially rearwardly of said throw plate, said yoke having diverging arms formed of said wire bale each extending toward a respective fore corner of the catcher, the wire bale of each said diverging arms being provided with an eye ring at the fore corner of the catcher for connecting the same to said mower, the remainder of each of said wire bale extending upwardly and being connected to said upper bowed member to provide struts at the fore corners of said catcher frame.

6. In a lawn mower grass catcher of the type including a frame having a bottom joined to an upper bowed member by a pliable skirting and provided at its fore end with a hinged throw plate from which extends a skid adapted to engage turf for swinging said throw plate rearwardly upon rearward movement of said catcher and lawn mower, a support for the bottom of said catcher for counteracting the lifting effect of said skid operated throw plate upon said catcher bottom comprising a U-shaped wire bale yoke, having a narrow bight portion pivotally connected to the under side of said catcher bottom substantially rearwardly of said throw plate, said yoke having diverging arms formed of said wire bale each extending toward a respective fore corner of the catcher, the wire bale of each said diverging arms being provided with an eye ring at the fore corner of the catcher for connecting the same to said mower, the remainder of each of said wire bale extending upwardly and being connected to said upper bowed member to provide struts at the fore corners of said catcher frame.

7. In a grass catcher adapted to be connected to the hooks on a lawn mower, and of the type including a solid bottom joined to an upper bowed member by a pliable skirting, a support for the bottom of said catcher facilitating articulation of said bottom while stabilizing the same relative to said mower comprising a wire bale yoke having a narrow bight portion pivotally connected to the under side of said catcher bottom adjacent the rearmost margin thereof, said yoke having a pair of diverging arms extending from said bight portion diagonally toward the fore corners of said catcher, and said diverging arms having looped ends connected to the hooks on said lawn mower for supporting the bottom of said catcher in substantially horizontal position facilitating rearward tilting of said catcher bottom without disconnecting the looped ends of said diverging arms from the hooks on said lawn mower.

8. In a grass catcher adapted to be connected to the hooks on a lawn mower and of the type including a solid bottom joined to an upper bowed member by a pliable skirting, a support for the bottom of said catcher facilitating articulation of said bottom while stabilizing the same relative to said mower comprising a wire bale yoke having a narrow bight portion pivotally connected to the under side of said catcher bottom adjacent the rearmost margin thereof, said yoke having a pair of diverging arms extending from said bight portion diagonally toward the fore corners of said catcher, loops formed therein for connection to the hooks on said lawn mower and the remainder of each of said diverging arms extending upwardly from the loop formed therein and being connected to the fore ends of said upper bowed member for supporting the bottom of said catcher in substantially horizontal position facilitating rearward tilting of said catcher bottom without disconnecting the looped ends of said diverging arms from the hooks on said lawn mower.

References Cited in the file of this patent

UNITED STATES PATENTS 2,440,934   De Vol _____ May 4, 1938